UNITED STATES PATENT OFFICE.

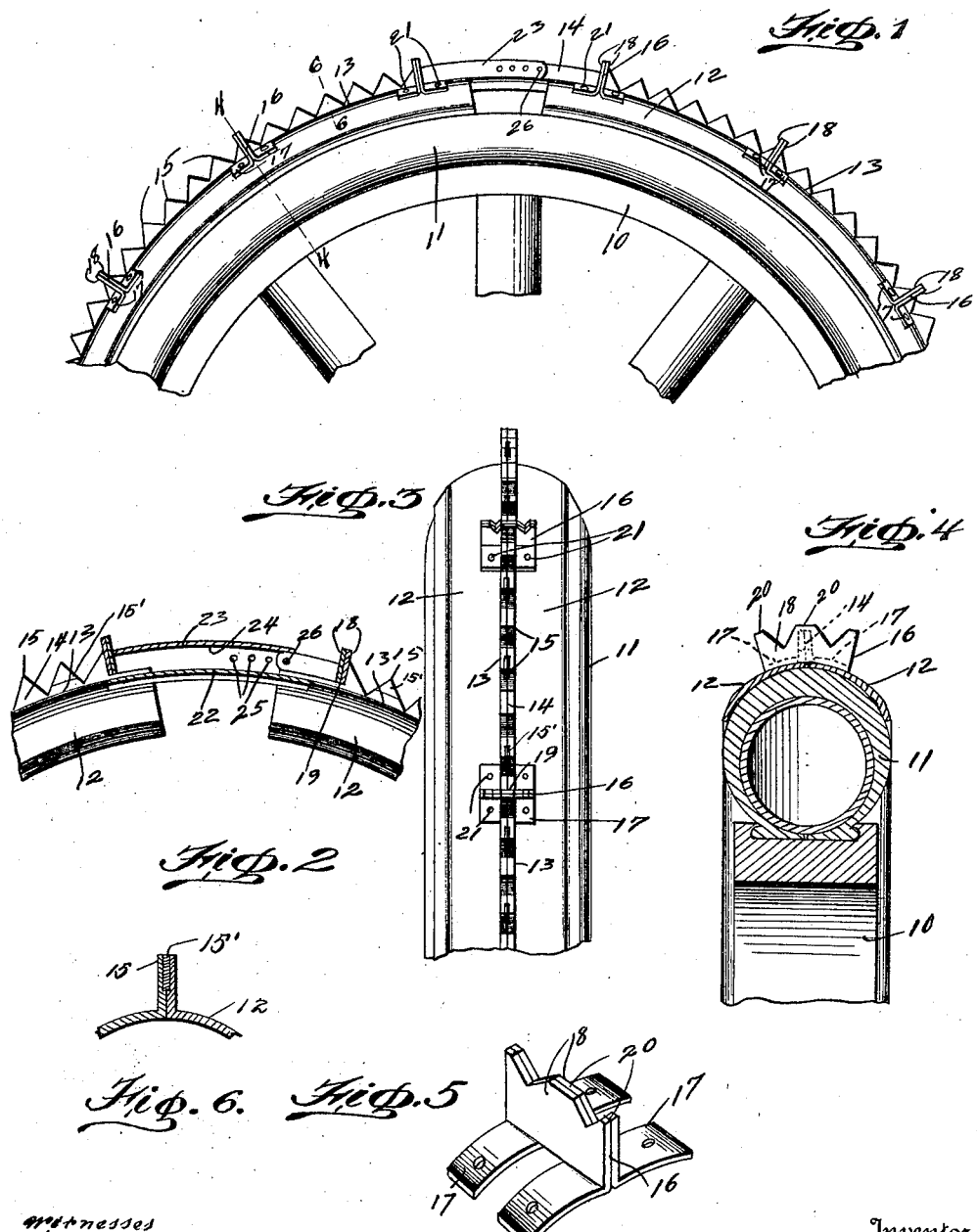

RENO ELMER POLLOCK, OF BEDFORD, OHIO.

ANTISKID DEVICE FOR VEHICLE-WHEELS.

1,324,065.  Specification of Letters Patent.  Patented Dec. 9, 1919.

Application filed March 15, 1918. Serial No. 222,652.

*To all whom it may concern:*

Be it known that I, RENO E. POLLOCK, a citizen of the United States, residing at Bedford, in the county of Cuyahoga, State of Ohio, have invented certain new and useful Improvements in Antiskid Devices for Vehicle-Wheels; and I do hereby declare the following to be a full, clear, and exact description of the invention, such as will enable others skilled in the art to which it appertains to make and use the same.

This invention is an improvement in vehicle wheels and has particular reference to an anti-skid device therefor.

An object of the invention is to provide an anti-skid device which may be readily and quickly applied to and securely retained on the tire of a vehicle wheel so as to prevent skidding and protect the tread thereof.

Another object is to provide a device of this character which is simple in construction, easy to manufacture and effective in carrying out the purpose for which it is designed.

The inventive idea involved is capable of receiving a variety of mechanical expressions one of which, for the purpose of illustrating the invention, is shown in the accompanying drawing wherein:—

Figure 1 is a side elevation of a wheel showing the device applied thereto.

Fig. 2 is a vertical longitudinal section.

Fig. 3 is a tread elevation.

Fig. 4 is a transverse section on the line 4—4 of Fig. 1.

Fig. 5 is a detailed perspective view of one of the auxiliary tread members of the device.

Fig. 6 is a detailed sectional view.

In the drawings, the numeral 10 indicates a vehicle wheel having the usual pneumatic tire 11 to which the anti-skid device embodied in the present invention is adapted to be applied.

The anti-skid device is shown in what is now believed to be its preferred form which comprises a pair of complemental split rings 12 that combine to form the body portion or main tread. The latter is adapted to encircle the tire 11 and is curved or arched transversely so as to conform substantially to the transverse contour of the tire and prevent lateral movement of the device with respect thereto and thereby avoid accidental detachment of the device. Each of the rings 12 is provided upon one edge with an outstanding flange 13 which abuts the flange of the other ring and these flanges are preferably welded together in order to provide a reinforced rib 14 which is serrated to form a plurality of gripping teeth 15 to prevent skidding of the vehicle wheel when running over smooth or slippery surfaces. To reinforce the teeth 15 every other tooth has embedded therein another tooth or projection 15' made of relatively hard material such as steel. In order that skidding of the wheel may be further prevented the device includes a plurality of auxiliary tread members 16 arranged at intervals about the circumference of the main tread and serving as an additional tie for holding its two flanges together. Each member comprises two flat plates 18 which may be welded or otherwise secured face to face and are notched or serrated along their outer edges to form teeth 20, and a pair of fingers 17 projecting from the inner edge of each plate away from and in line with the fingers of the other plate; and, as seen in Fig. 5, the fingers of both pairs are spaced slightly. Occasional teeth 15 of the rib 14 have notches 19 extending radially inward from their tips to their bases, and into each notch is inserted the tie plates 18 of one of said auxiliary tread members, its fingers passing down astride the rib 14 onto the rings 12 to which they are secured by means of rivets or other fasteners 21.

The rings 12 are preferably made of material with sufficient resiliency to permit of the ends of the main or body portion of the device being adjusted toward and away from each other and one end of said main portion is provided with an extension 22 the free end of which is adapted to engage the inner surface of the adjacent end of the main or body portion of the device to form a closure therefor when the ends of the body portion are spaced apart. In order to secure these ends together when the device is in its proper position upon the tire, the end opposite that to which the extension 22 is secured, is provided with a circumferentially extending coupling plate 23 bent upon itself to provide a channel 24 for receiving the end of the rib 14 opposite said plate, the latter being provided with a plurality of openings 25 any one of which is adapted to receive a bolt or other fastener 26 which extends also through the rib 14 and thereby secures the ends of the main portion together. A number of the openings 25 are provided in order that the device may be adjusted about tires of different sizes.

What is claimed is:—

An anti-skid device for vehicle wheels comprising two rings disposed edge to edge to form a main tread and having abutting outstanding circumferential flanges serrated to form teeth, certain teeth having radial notches from their tips to their bases, and tying auxiliary tread members at intervals about the main tread, each including a pair of transverse plates disposed in one of said radial slots and having oppositely directed circumferential fingers fixed upon the rings at opposite sides of said serrated flanges.

In testimony whereof, I affix my signature, in the presence of two witnesses.

RENO ELMER POLLOCK.

Witnesses:
J. HERMAN CARSE,
HELEN J. CASKEY.